United States Patent Office 2,742,306
Patented Apr. 17, 1956

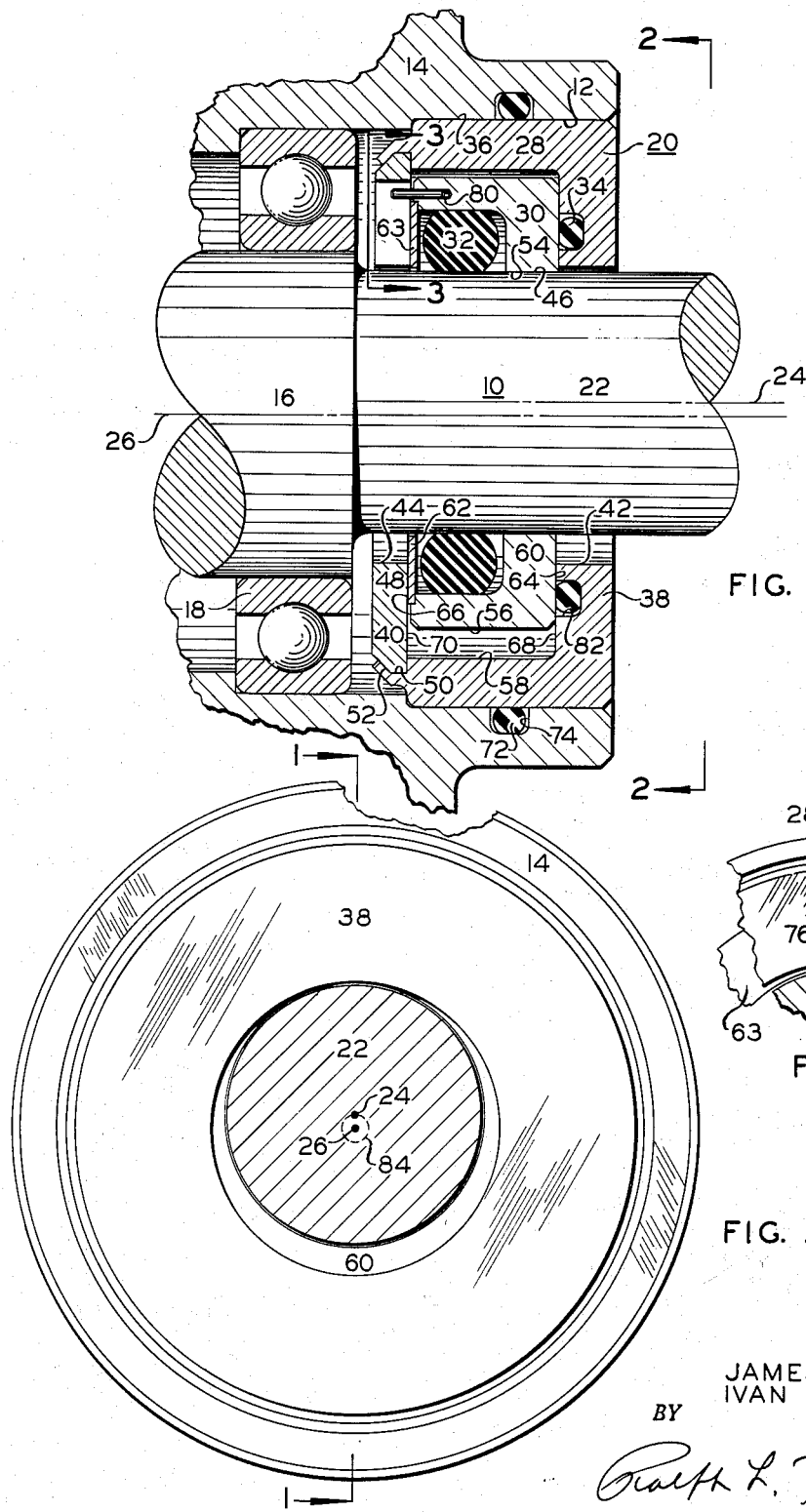

2,742,306

SEAL ASSEMBLY

James W. Kelso and Ivan Hamel, Detroit, Mich., assignors to Vickers Incorporated, Detroit, Mich., a corporation of Michigan Application February 2, 1953, Serial No. 334,498

2 Claims. (Cl. 286—15)

This invention relates to power transmissions, and is particularly applicable to those of the type comprising two or more fluid pressure energy translating devices, one of which may function as a pump and another as a fluid motor.

This invention is generally concerned with a fluid seal, and in particular to a seal assembly for employment between a rotating shaft and a stationary part.

The sealing device is particularly suitable for applications wherein a rotary shaft to be sealed, because of play, misalignment or other reasons, rotates about an axis different from the axis of the shaft to be sealed.

Sealing devices previously proposed for maintaining adequate sealing in spite of the eccentric action have often incorporated special spring constructions or taken the form of specially molded resilient members which must be bonded to accompanying metallic members. Some of these devices incorporate therein a diaphragm which is intended to seal between the members and permit relative radial movement therebetween. Many of these sealing devices have been complicated and of expensive construction, incapable of resisting for any extended service the distortion and radial movements caused by misalignment and eccentricity of the relatively rotatable members.

It is therefore an object of this invention to provide an improved seal assembly which may be inserted in operative position as a unit.

It is a further object of this invention to provide a sealing device which will provide proper sealing conditions notwithstanding inaccuracies in alignment or eccentricities of the shaft.

It is another object of this invention to provide a seal assembly for relatively rotatable elements, such as a stationary housing and a rotary shaft extending therethrough, which is insertable in the housing as a unit and which will maintain adequate shaft sealing in spite of alignment inaccuracies or eccentricity of the shaft.

It is still another object of this invention to provide a seal assembly of simple, economical construction and possessing the characteristics of efficiency, long life and ease of assembly and operation.

Further objects and advantages of the present invention will be apparent from the following description, reference being had to the accompanying drawing wherein a preferred form of the present invention is clearly shown.

In the drawing:

Figure 1 is a sectional view embodying a preferred form of the present invention and taken on line 1—1 of Figure 2.

Figure 2 is an end view taken on line 2—2 of Figure 1.

Figure 3 is a partial sectional view taken on line 3—3 of Figure 1.

Referring to Figure 1, there is shown a rotary shaft 10 extending through a cylindrical recess 12 of a stationary housing 14. The shaft 10 is provided with an enlarged section 16 which rotates within a bearing 18. Spaced apart from the bearing 18 is a unitary sealing assembly indicated by the numeral 20 which is press-fitted in recess 12 and which surrounds a smaller section of shaft 10 indicated by the numeral 22.

For the purpose of more conveniently and clearly describing the operation of the sealing device, the longitudinal axis 24 of the smaller section of the shaft 10 has been illustrated as out of alignment with the longitudinal axis 26 of the larger section of the shaft, the eccentricity of the same being purposely exaggerated.

The sealing assembly 20 comprises an outer housing or retainer member 28, and an inner retainer member 30 which carries an O-ring 32 of deformable material, such as synthetic rubber. A second O-ring 34 may be placed between the retainer members for maximum sealing efficiency. The retainer members are preferably constructed of a material so as to be substantially non-deformable, such as steel or aluminum alloy.

The outer retainer member 28 is provided with a cylindrical outer peripheral surface 36 to mate with the recess surface in which it is press-fitted and is substantially U-shaped in cross section. The legs of the outer retainer 28 form parallel side walls indicated by the numerals 38 and 40 extending perpendicularly toward the shaft 10. The extremities of the side walls indicated by the numerals 42 and 44 are spaced from the cylindrical portion 46 of the shaft adapted to be sealed. The side wall 40 may comprise a separate flat metallic ring 48, the inner edge of which, after the inner retainer 30 has been inserted may be placed on a shoulder 50 of the retainer 28, and the edge of the retainer pressed over a tapered edge 52 of the ring 48 to hold the same in place.

The inner retainer member 30 is provided with an inner, shaft engaging, cylindrical surface 54 and with an outer, cylindrical surface 56 adapted to be completely spaced from an inner cylindrical surface 58 of the outer retainer 28. The outer surfaces of the side walls 60 and 62 of the inner retainer member 30, and which are indicated by the numerals 64 and 66, are adapted to slidably engage the inner surfaces of the side walls 38 and 40 of the outer retainer 28, and which are indicated by the numerals 68 and 70. The side wall 62 of the inner retainer members 30 may comprise a washer 63 which also serves to prevent extrusion of the O-ring 32.

An O-ring 72 has been illustrated as being mounted in groove 74 of the stationary housing 14 for the purpose of sealing between said housing and the outer retainer member. The O-ring 72 may optionally be mounted in a groove provided in the outer peripheral surface of the retainer 28.

Referring to Figures 1 and 3, in order to prevent rotation of the inner retainer member and still provide relative radial movement between the inner and outer retainer members, a slot 76 may be provided in the side wall 40 of the retainer 28 through which a pin 78 may be inserted into a hole 80 in the inner retainer 30. The diameter of the slot being substantially the same diameter of the pin, relative rotation between the retainer members is prevented, but the pin may slide radially in the slot to permit relative radial movement between the retainer members. There may also be provided, for example, a groove and detent structure formed respectively in the retainer members which will provide the same result as the slot and pin construction.

Although the O-ring 34 has been illustrated as being mounted in a groove 82 in the outer retainer member 28, it should be noted that the same sealing result may be obtained by providing a groove in the inner retainer 30 and mounting the O-ring 34 therein.

Referring now to Figures 1 and 3, in operation, due to the misalignment of the large and small sections of the shaft 10, although the shaft will rotate true relative to its bearing support, the smaller section of the shaft will not rotate about its own axis 24, but about axis 26. Stated in another way, the axis 24 of the smaller section 22 of the shaft 10 will describe a circular path about the axis 26 of the larger shaft section 16 as indicated by the dotted outline 84 in Figure 2. As the circular path is described, the inner retainer will follow the movement of said path because it is engaged with the cylindrical surface 46 of said shaft. The outer retainer member will remain stationary, and the inner retainer is prevented from rotating but will shift radially to comply with the rotation of the smaller section of the shaft about the axis 26. The inner retainer is free to shift radially because of the slot and pin arrangement, and adequate sealing around the shaft is continuously maintained by the O-ring 32, the compression of which remains the same because it follows the movement of the shaft but does not rotate with it. The O-ring 32 will tend to shift toward the side walls 60 or 62 depending upon whether pressure or vacuum exists on the bearing side of the seal. The outer side wall surfaces 64 and 66 of retainer 30 slide against the inner side wall surfaces 68 and 70 of the outer retainer 28. As previously stated, more efficient sealing is provided between the engaging side walls by means of the O-ring 34.

The spacing between the inner cylindrical surface 58 of the outer retainer 28 and the outer cylindrical surface 56 of the inner retainer 30 permits the inner retainer to follow the non-concentric rotary motion of the smaller section of the shaft. Preferably, the spacing should be adequate to prevent contact of any portion of the opposing cylindrical surfaces at all times.

The invention therefore provides an easily and economically manufactured, durably constructed and simply installed sealing device which will maintain adequate and efficient sealing between relatively stationary and rotatable elements in spite of misalignment and eccentricities of said elements.

While the form of embodiment of the invention as herein disclosed constitutes a preferred form, it is to be understood that other forms might be adopted, all coming within the scope of the claims which follow.

What is claimed is as follows:

1. In combination with a substantially non-deformable outer retainer member and a relatively rotative member passing therethrough having a cylindrical surface to be sealed, said outer retainer member being U-shaped in cross section the legs of which extend toward the cylindrical surface and being spaced therefrom, a substantially non-deformable inner retainer member within the outer retainer member the side walls of which are in slidable engagement with the legs of said outer retainer member, said inner retainer member having an inner peripheral surface in engagement with the cylindrical surface and having an outer peripheral surface spaced from the inner peripheral surface of the outer retainer member, means non-rotatably fastening the inner retainer member to the outer retainer member and permitting relative radial movement therebetween, and a resilient sealing member carried by the inner retainer member having a sealing portion in engagement with the cylindrical surface.

2. In combination, a housing member, a rotatable member passing through the housing member and having a cylindrical surface to be sealed, a self-contained sealing unit mounted in the housing member comprising a substantially non-deformable outer retainer member having an inner cylindrical surface with side walls extending therefrom, the extremities of which surround the cylindrical surface to be sealed but which are spaced therefrom, a substantially non-deformable inner retainer member having an outer cylindrical surface spaced from the other retainer cylindrical surface and having side walls extending therefrom which are in sliding engagement with the outer retainer side walls, said inner retainer member having an inner cylindrical surface engaging the cylindrical surface to be sealed, means non-rotatably fastening the inner and outer retainer members to each other and permitting relative radial movement therebetween, and a resilient sealing member carried by the inner retainer member having a sealing portion engaging the cylindrical surface to be sealed.

References Cited in the file of this patent

UNITED STATES PATENTS

| | | |
|---|---|---|
| 1,583,291 | Hawley | May 4, 1926 |
| 2,017,615 | Bary | Oct. 15, 1935 |
| 2,143,249 | Pool | Jan. 10, 1939 |
| 2,185,554 | Janette | Jan. 2, 1940 |
| 2,258,416 | Leopold et al. | Oct. 7, 1941 |
| 2,483,827 | Guiler | Oct. 4, 1949 |
| 2,500,359 | Jewett | Mar. 14, 1950 |
| 2,535,288 | Honkanen | Dec. 26, 1950 |

FOREIGN PATENTS

| | | |
|---|---|---|
| 409,600 | Great Britain | May 3, 1934 |
| 587,248 | Great Britain | Apr. 18, 1947 |